United States Patent [19]

Milfait

[11] 3,826,907

[45] July 30, 1974

[54] ARRANGEMENT FOR MONITORING A PROGRAMMABLE CONTROLLER FOR A KNITTING MACHINE

[75] Inventor: Zdenek Milfait, Brno, Czechoslovakia

[73] Assignee: Vyzkumny a vyvojovy ustav Zavodu vseobecneho strojirenstvi, Brno, Czechoslovakia

[22] Filed: Sept. 11, 1972

[21] Appl. No.: 287,814

[30] Foreign Application Priority Data

Sept. 10, 1971 Czechoslovakia .................. 6490-71

[52] U.S. Cl. .......................................... 235/153 AC

[51] Int. Cl. ............................................ G06f 11/00

[58] Field of Search .............. 235/153 AC, 153 AH; 340/146.1 AJ, 146.1 BA; 66/50 B

[56] References Cited

UNITED STATES PATENTS

| | | | |
|---|---|---|---|
| 3,124,783 | 3/1964 | Adams | 340/146.1 AJ |
| 3,582,880 | 6/1971 | Beausoleil et al. | 235/153 AH |
| 3,612,843 | 10/1971 | Aptroot-Soloway | 235/153 AH |
| 3,714,571 | 1/1973 | Walker | 235/153 AC |
| 3,719,929 | 3/1973 | Fay et al. | 235/153 AC |

*Primary Examiner*—Charles E. Atkinson
*Attorney, Agent, or Firm*—Arthur O. Klein

[57] ABSTRACT

An arrangement for instantaneously monitoring both the entry of information into and the outpulsing of control signals from a multi-track programmable controller for a knitting machine is described. A first of three coded instructions on a tape represents the input information and is converted to a first pulse sequence, which is applied to a particular track of the controller and is simultaneously applied to a preset counter, wherein the erroneous entry into the counter of more pulses than the number corresponding to the first instruction is sensed as a first error indication in the form of an output pulse from the counter. If the input information is correctly entered, a second coded instruction on the tape is converted to a replica of the entered input information and is temporarily stored in a memory. A third coded instruction on the tape is then converted to scanning pulses for reading out the programmed bit states of the controller. The read-out sequence is compared with the stored replica of the input information, and any deviation therebetween is sensed as a second error indication. Both the first and the second error indications may be effective both to stop the then-current tape to pulse conversion and to activate an alarm indication.

6 Claims, 4 Drawing Figures

ARRANGEMENT FOR MONITORING A PROGRAMMABLE CONTROLLER FOR A KNITTING MACHINE

BACKGROUND OF THE INVENTION

Modern control techniques for knitting machines, in particular multi-color circular knitting machines, may include the programming of a magnetic drum or core storage device having a plurality of "tracks" (i.e., a plurality of drum columns or a plurality of core planes). Each track is associated with a different color and has a plurality of bit positions which are commonly at least equal in number to the discrete segments of a pattern sample whose characteristics are to be duplicated on the knitted fabric.

In many cases, the tracks may be programmed by arrangements that include photoelectric scanning. The associated photoelectric facilities are often complicated and cumbersome; and more important for present purposes, it has been in the past difficult to determine in an expeditious manner (without running through the entire program of the machine and inspecting the knitted pattern) whether the programming data read into a particular one of the tracks from the photoelectric scanning section is entered correctly. Additionally, it has been difficult to determine whether the control data read out of the track to control the associated electromagnetic actuator of the knitting machine actually corresponds to the information read into the track, even if such information is correct.

SUMMARY OF THE INVENTION

The instant invention provides an effective means of instantaneously ascertaining both the correctness of the entry of programming information into each track of the controller and the correlation of the machine control information read out of the track with the corresponding programming information read into it.

In this arrangement, the programming information is carried on a coded tape having, for each color, first, second, and third coded instructions which are fed into the monitor during first, second and third successive intervals. The first instruction is representative of the program readable into the successive bit positions of the track; the second instruction is essentially a replica of the first instruction; and the third instruction is a sequence of scanning pulses for effecting the read-out of programmed information from the track.

During the first sequence, a tape reader under the control of a clock pulse generator converts the first instruction to a sequence of pulses, with the presence of a pulse representing, e.g., a binary one in the coded instruction and the absence of a pulse, a binary zero. The pulses in the first sequence are applied to corresponding bit positions on the track. Each pulse in the first sequence is also applied to a counter having a preset count therein; the preset count corresponds to the correct number of binary "ones" in the first coded sequence. If an error occurs in entering the first pulse sequence in the track such that more pulses are present at the output of the tape reader than are called for by the first instruction on the tape, the counter yields an output pulse which disables the clock pulse generator and stops the tape to pulse conversion. Such output pulse from the counter may also actuate an alarm device to call attention to the defect in the read-in of the program.

If the read-in sequence is correct, the second coded instruction on the tape is converted into a second sequence of pulses by the tape reader and is stored in a memory as a replica of the program read-in to the track during the first sequence. The third coded sequence is then converted into scanning pulses which are effective to read out the actual bit state of each bit position in the track. The read-out sequence is compared with the replica of the read-in program stored during the second interval. Any deviations of the actual bit pattern read into the memory during the third interval from the read-in pulse rendition is effective to disable the clock pulse generator, thereby terminating the then-current tape to pulse conversion. An alarm indication may be activated upon such deviation to call attention to the lack of correspondence between the actual bit states of the programmed track and the input information entered therein from the tape reader.

BRIEF DESCRIPTION OF THE DRAWING

The invention will be set forth more fully in the following detailed description taken in conjunction with the appended drawing, in which.

DETAILED DESCRIPTION

The invention relates to an electronic device for set out of pins to drums of knitting machines. The control tape containing information for set out of pins is produced in a computer, the input information of which is formed by a pattern draft, which is transferred to the punched tape course after course, color after color. In accordance with the type of knitting machine the computer performs the itemizing, so that the information of the color pattern is registered on the control tape in the sequence corresponding to that one in which the pins are set out into the drum.

Figure 1:
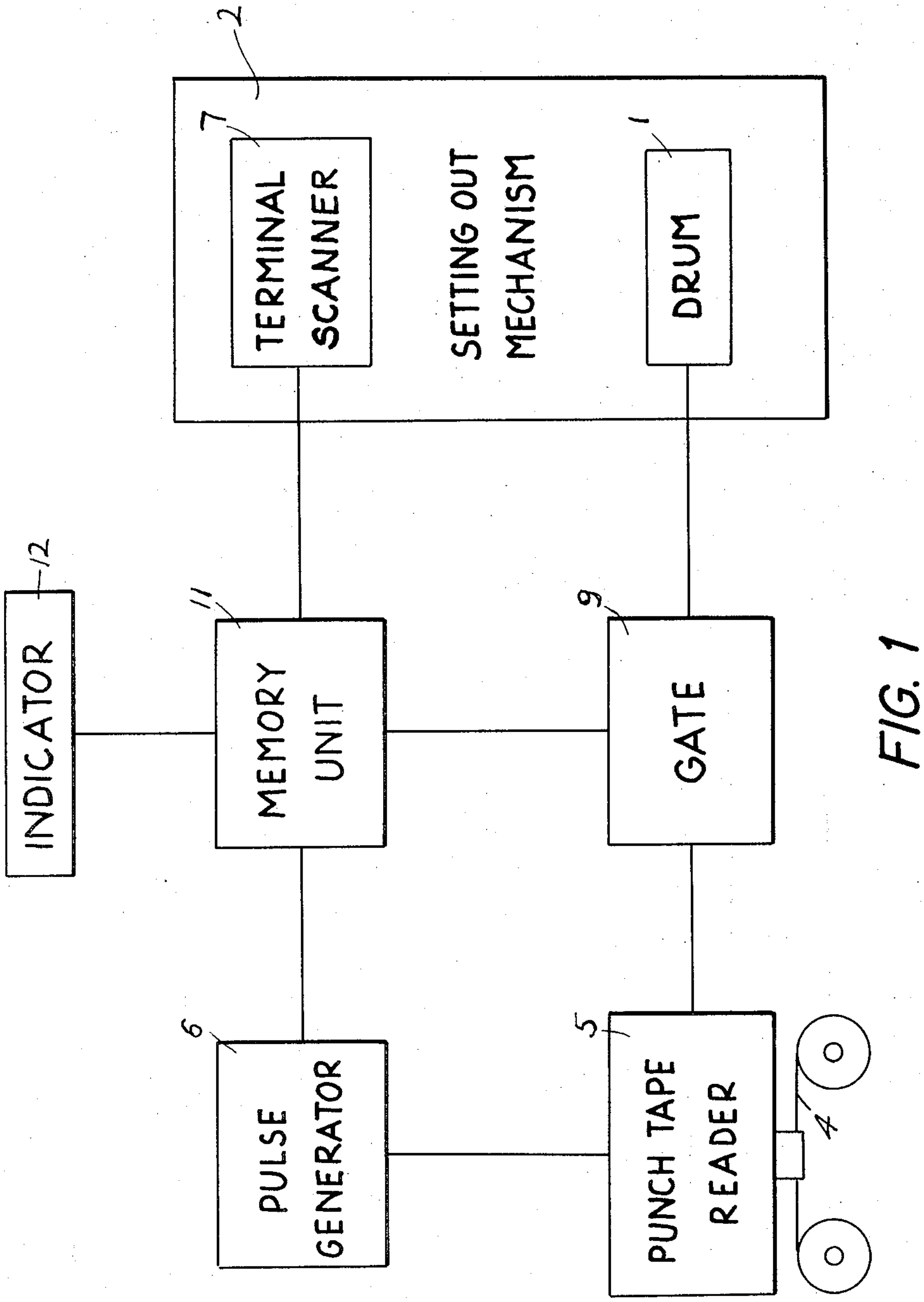
FIG. 1 is a block diagram of an overall arrangement for monitoring a programmable controller for a knitting machine in accordance with the invention.

FIG. 1 depicts an overall arrangement for monitoring the read-in and read-out of information to and from a multitrack programmable portion 1 of a controller 2 suitable for regulating a multi-color knitting machine (not shown). In a well known manner, the controller 2 may be employed to operate the separate knitting systems of the machine, which may illustratively be of the circular bed type described in U.S. Pat. No. 2,173,488 issued to W. S. Tandler et al.

Figure 3:
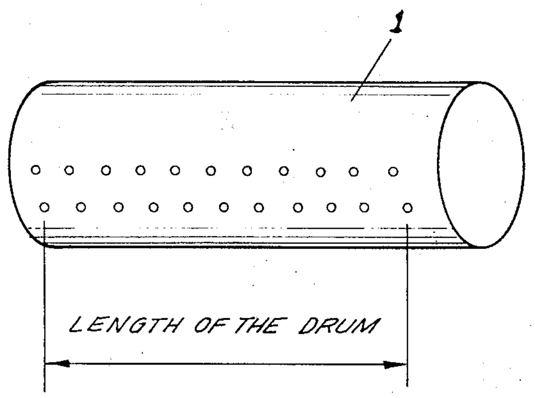
FIG. 3 is a view in perspective of a portion of a programmable drum which is employed in conjunction with a control tape in accordance with the invention.

The portion 1 includes a conventional pattern drum (FIG. 3) into which pins for operating the machine may be set in accordance with incident control data. The data incident on the programmable portion 1 may be indicative of the actual color distribution along a selected path of a multicolor pattern sample (not shown). For purposes of the invention, such data are initially in the form of coded instructions represented by suitable hole pattern registered in a control tape 4 and described in more detail below. Data relevant to different ones of the colors are registered as different instructions on the tape 4.

Each coded instruction on the tape 4 is converted to a sequence of pulses at a clock rate by a tape reader 5 under the control of a clock pulse generator 6. The frequency of the generator 6 may be made adjustable to allow for flexibility in the speed of programming and operation of the machine. The presence of a pulse at the tape reader output in a given clock pulse time slot may illustratively represent a binary "one" on the associated portion of the coded tape, while the absence of a pulse in a given time slot may represent a binary "zero" of the instruction.

Figure 4:
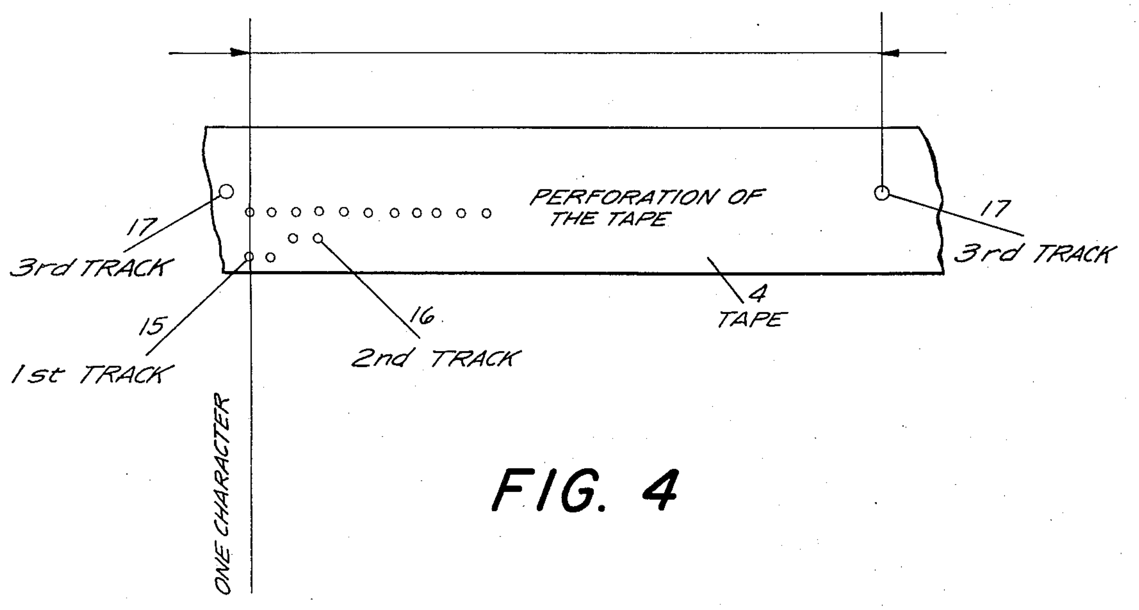
FIG. 4 is a fragmentary view in plan of a portion of the control tape including an extent thereof corresponding to one column of the drum.

The control tape 4 (FIG. 4), on which the items of the color pattern for the drums of the Jacquard knitting machines are recorded, is inserted into the reader 5 of the electronic device. According to the specified example, is in the second track 16 of the punched tape of each character. In the third track 17 of the last character there is an information indicating that the number of the preceding characters containing information on setting out or on non-setting out of pins, corresponds to the number of holes in one column of the drum. If the number does not correspond, the device stops the movement of the tape and the turning of the drum. In this way an error is prevented from being transferred to the next column of the drum. The operator must check the reason of the fault and bring the drum into line with the punched tape. According to the kind of the error the column of the drum is to be nullified and set out anew and the control tape in this case must be set back to the preceding monitoring character in the third track. Thus the object of the device is chiefly to set out the pins to the drum according to the information stored in the punched tape, the punched tape performing also the monitoring function.

The gate serves to separate the signals for the controller of the setting out and not setting out in the first and in the second track from the monitoring signal in the third track for the storage (memory). If there is no character in the first or the second track, the gate does not transmit any signal to the controller and the tape passes to the next character.

The storage records an information in the third monitoring track and if no information from the terminal switch of the counter follows, which would reset it (i.e. the storage) to the original state, the storage stays clamped and at the next word time of the generator, the pilot lamp is switched on. After the error had been cleared away, the storage is reset to the original state by means of the operating push button. For convenience of description, the portion 1 will be assumed to incorporate conventional magnetic read-in, read-out and storage facilities for receiving and executing coded instructions from the tape 4. The drum tracks are defined by axially spaced annular regions on the drum periphery. Each track includes a plurality of bit positions individually corresponding to separate segments of the pattern sample (not shown). The track representing a particular color is conditioned to receive data from the tape (and to outpulse data registered in such track) only during the time that the coded information on the tape corresponds to such color.

While not specifically illustrated in the drawing, it will be understood that appropriate color data from the coded tape may be written into the separate bit positions of the associated track of the programmable portion 1 through individual write-in heads in magnetic communication with the track. In like manner, the bit states entered into such track may be read out to the associated actuator of the machine through individual read-out heads in magnetic communication with the track.

In the arrangement shown in FIG. 1 the read-out bits of the track may be detected and sampled by a conventional terminal scanner 7 upon the excitation of the portion 1 by appropriate scanning commands from the tape 4.

Ordinarily, since the tracks of the portion 1 are actuated in sequence, the entire programmed contents of the portion 1 must be read out to knit a multi-color fabric segment before any errors in the entry or read-out of information into or out of the associated track may be determined, e.g., from an inspection of the fabric segment.

In accordance with the invention, both the correctness of entry of the tape-coded information into the associated track of the portion 1 and the correlation of the information read-out of such track with the program information read into it may be quickly determined without the necessity of executing the entire machine program or the consequent knitting of the fabric.

One illustrative manner of carrying out the monitoring operation of the invention contemplates that three successive coded instructions be registered in the coded tape for each color to be programmed into the machine. During first and second successive intervals corresponding to the feeding of the first and second of the three coded instructions into the monitor, the pulse sequences at the output of the tape reader 5 ideally define the program to be entered into the successive bit positions of the conditioned track. The third instruction on the tape defines scanning pulses that operate the track read-out heads and the terminal scanner 7 after the entry of the data.

Figure 2:
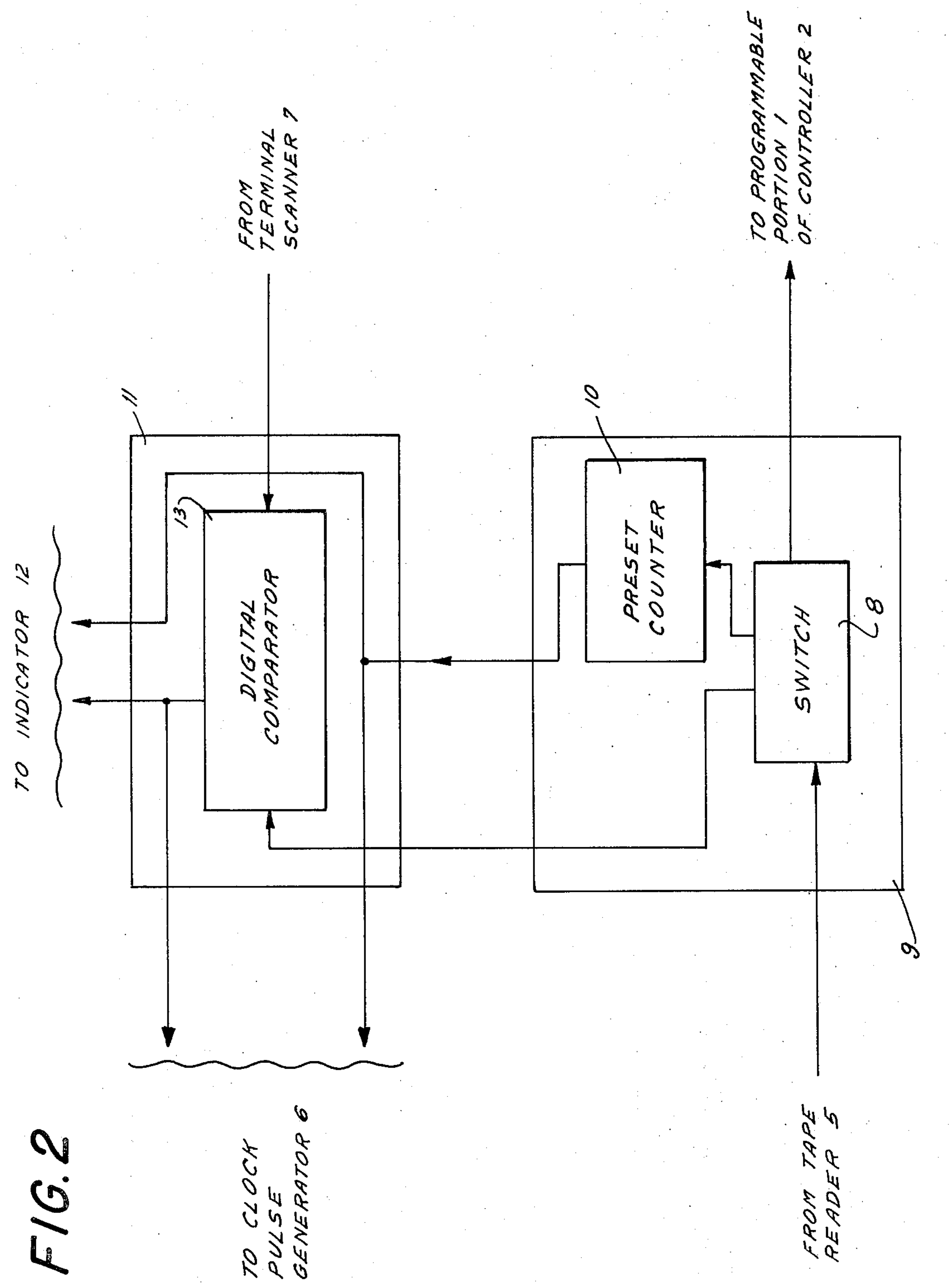
FIG. 2 is a more detailed block diagram of a portion of the arrangement of FIG. 1.

During the conversion of the first coded instruction on the tape into pulse form by the tape reader 5, each pulse at the output of the reader is applied through a switch 8 (FIG. 2) in a controllable gate section 9 to appropriate bit positions in the conditioned track of the programmable portion 1. Such pulses are simultaneously applied via the switch 8 to the input of a counter 10 within the gate section 9, such counter being preset to yield an output pulse when the number of pulses applied to its input exceeds a predetermined count representative, e.g., of the number of binary "ones" in the first coded instruction on the tape. The output of the counter 10 is coupled via a memory section 11 to a disabling input of the clock pulse generator 6 (FIG. 1) and to an alarm or other suitable indicator 12. Consequently, if the number of pulses actually entered into the conditioned track (and thereby into the counter) exceeds the number of pulses corresponding to a correct translation of the first coded instruction, the resulting output pulse from the counter disables the clock pulse generator 6 to stop the then-current tape to pulse conversion and also operates the alarm to signal the error in the entry of programming information to the conditioned track.

If the entry of programming information during the first sequence is correct, the tape-to-pulse conversion proceeds with the second coded instruction on the tape. During the second sequence, the pulses at the output of the tape reader 5, which are replicas of the pulses read into the conditioned track during the first sequence, are coupled by the switch 8 (FIG. 2) to one input of a digital comparator 13 in the memory section 11, where such replica is temporarily stored. The output of the comparator 13, like that of the counter 10, is coupled both to a disabling input of the clock pulse generator 6 and to the alarm 12.

Such temporary storage is followed by a tape-to-pulse conversion of the third coded sequence on the tape, which yields scanning pulses that are coupled through the switch 8 to the programmable portion 1. Such scanning pulses are effective to sweep the bit positions of the track via the read-out head associated therewith and the terminal scanner 7. The scanner 7 accordingly detects the actual bit states of the portion 1 and couples the resultant sequence of pulses to the second input of the digital comparator 13 in the memory section 11. So long as the bit sequence applied to such second input is identical with the corresponding portion of the programmed data replica which was applied to the first input of the comparator during the second instruction, the comparator 13 will be quiescent. However, if at any time during the third instruction the information and the first and second inputs of the comparator 13 do not coincide (indicating a disparity between the information outpulsed from the conditioned track and the information entered into it) the comparator will yield an output pulse to disable the generator 6 and stop the then-current tape-to-pulse conversion, and will also operate the alarm 12.

After the then-conditioned track is thus monitored for accuracy of both read-in and read-out of information, each of the other tracks of the portion 1 may be similarly monitored in sequence.

In the foregoing, the invention has been described in connection with a preferred arrangement thereof. Many modifications will now be obvious to those skilled in the art. It is accordingly desired that the scope of the appended claims not be limited to the specific disclosure herein contained.

What is claimed is:

1. For use with a knitting machine, a method of monitoring the operation of programmable indicia storage means for controlling the knitting machine wherein the storage means has a plurality of separate storage tracks and wherein each track has a plurality of bit positions excitable in accordance with input information from a coded tape, which comprises the steps of:

executing a first conversion from a first coded instruction on the tape to a first pattern of pulses;

sequentially entering the first pattern of pulses into successive bit positions in a predetermined track of the storage means;

terminating the first conversion if the number of pulses entered into the predetermined track exceeds a predetermined number normally associated with the first coded instruction;

executing a second conversion from a second coded instruction on the tape to a second pattern of pulses that defines a replica of the first pattern of pulses;

storing the second pattern of pulses;

executing a third conversion from a third instruction on the tape to a third pattern of pulses;

sequentially reading out the bit states at the outputs of the bit positions of the predetermined track in response to the third pattern of pulses to define a fourth pattern of pulses ideally corresponding to the second pattern of pulses;

comparing the fourth pattern of pulses with the stored second pattern; and terminating the third conversion upon a noncoincidence of the fourth pattern and the second pattern.

2. A method as defined in claim 1, further comprising the step of actuating an alarm upon the termination of the first conversion.

3. A method as defined in claim 1, further comprising the step of actuating an alarm upon the termination of the third conversion.

4. In an apparatus for monitoring the operation of a programmable indicia storage means that controls a knitting machine wherein the storage means has a plurality of separate storage tracks and wherein each track has a plurality of bit positions excitable in accordance with input information from a coded tape:

means for converting first, second and third successive coded instructions on the tape to first, second and third successive patterns of pulses;

a counter having a preset count and adapted to yield an output pulse when said count is exceeded;

means responsive to the first pattern of pulses from the converting means for (a) applying the successive pulses in the first pattern to successive bit positions in a predetermined track of the storage means so that the resulting output bit states of said track define a fourth pulse pattern ideally corresponding to the first pattern, and for (b) simultaneously applying said successive pulses to the input of the counter;

first means operable in response to an output pulse from the counter for disabling the converting means;

memory means including a digital pulse comparator having first and second inputs and adapted to yield an output pulse upon a non-coincidence of pulse patterns respectively applied to the first and second inputs;

means responsive to the second pattern of pulses from the converting means for applying the second pattern to the first input of the comparator;

means responsive to the third pattern of pulses from the converting means for applying the fourth pulse pattern to the second input of the comparator; and second means responsive to an output pulse from the comparator for disabling the converting means.

5. Apparatus as defined in claim 4, in which the apparatus further comprises alarm means, and means for actuating the alarm means upon the operation of the first disabling means.

6. Apparatus as defined in claim 4, in which the apparatus further comprises alarm means, and means for actuating the alarm means upon the operation of the second disabling means.

* * * * *